US 8,446,860 B2

(12) United States Patent
Zhu et al.

(10) Patent No.: US 8,446,860 B2
(45) Date of Patent: May 21, 2013

(54) APPARATUS AND METHOD FOR NETWORK ACCESS DEVICE LOCALIZATION ON A WIRELESS NETWORK

(75) Inventors: Chenxi Zhu, Gaithersburg, MD (US); Wei-Peng Chen, Santa Clara, CA (US)

(73) Assignee: Fujitsu Limited, Kawasaki-shi (JP)

( * ) Notice: Subject to any disclaimer, the term of this patent is extended or adjusted under 35 U.S.C. 154(b) by 809 days.

(21) Appl. No.: 12/466,891

(22) Filed: May 15, 2009

(65) Prior Publication Data

US 2010/0034180 A1 Feb. 11, 2010

Related U.S. Application Data

(60) Provisional application No. 61/086,978, filed on Aug. 7, 2008.

(51) Int. Cl.
*H04W 4/00* (2009.01)
(52) U.S. Cl.
USPC ........................................ 370/328; 455/404.2
(58) Field of Classification Search
None
See application file for complete search history.

(56) References Cited

U.S. PATENT DOCUMENTS

| H0001941 H  * | 2/2001 | Hoffpauir et al. ......... 379/265.13 |
| 7,091,903 B2 * | 8/2006 | Kim ......................... 342/357.55 |
| 7,450,544 B2 * | 11/2008 | Rue ............................... 370/331 |
| 7,668,123 B1 * | 2/2010 | Scott et al. ..................... 370/310 |
| 8,089,400 B1 * | 1/2012 | Fang et al. ............... 342/357.42 |
| 2005/0272406 A1 * | 12/2005 | Mizikovsky et al. .......... 455/411 |
| 2006/0126536 A1 * | 6/2006 | Patel et al. ..................... 370/254 |
| 2008/0139206 A1 * | 6/2008 | Touray et al. ................. 455/437 |
| 2009/0245241 A1 * | 10/2009 | Martin .......................... 370/360 |
| 2009/0286510 A1 * | 11/2009 | Huber et al. .................. 455/410 |

* cited by examiner

*Primary Examiner* — Hassan Kizou
*Assistant Examiner* — Roberta A Shand
(74) *Attorney, Agent, or Firm* — Baker Botts L.L.P.

(57) ABSTRACT

According to an example embodiment, a method for wireless communication includes establishing a communication session between a base station associated with a wireless network and a network access device associated with a separate communications network. The network access device provides the base station access to the communications network. The method further includes receiving location information from the network access device. The location information describes the location of the network access device. The network device receives the location information from a server on the communications network. In addition, the method includes providing a service to at least one wireless device utilizing the location information.

38 Claims, 3 Drawing Sheets

APPARATUS AND METHOD FOR NETWORK ACCESS DEVICE LOCALIZATION ON A WIRELESS NETWORK

RELATED APPLICATION

This application claims benefit under 35 U.S.C. §119(e) of U.S. Provisional Application Ser. No. 61/086,978, entitled "SYSTEM AND METHOD FOR LOAD POSITIONING WIRELESS ACCESS POINTS,", filed Aug. 7, 2008, by Chenxi Zhu et al.

TECHNICAL FIELD

This invention relates generally to wireless communication and more particularly to an apparatus and method for network access device localization on a wireless network.

BACKGROUND

IEEE 802.16 is an emerging suite of standards for Broadband Wireless Access (BWA) commonly known as WiMAX. WiMAX is one of the wireless technologies targeting the fourth generation of wireless mobile systems. The IEEE 802.16e amendment to the IEEE 802.16 base specification enables combined, fixed, and mobile operation in licensed and license-exempted frequency bands under 11 GHz. IEEE 802.16 defines a high-throughput packet data network radio interface capable of supporting several classes of Internet Protocol (IP) applications and services including isochronous applications such as Voice Over IP (VoIP) and applications with burst data access profiles such as Transfer Control Protocol (TCP) applications.

The basic WiMAX network coverage is provided using an approach similar to other mobile wireless technologies (e.g., using high power macro base stations). In order to increase the intra-cell coverage and capacity, distributed small base station entities have been considered. Depending on the number of target users and the type of applications envisioned, these small base station entities have been defined by the WiMAX industry as nano, pico or femto base stations.

The femto base station (fBS) is the smallest base station entity. An fBS is, in essence, a small WiMAX base station that a owner can purchase and install in his home or office. It basically provides the owner's MS the same air interface function as an mBS based on the IEEE 802.16 standard. Compared to a mBS, the fBS is a low-cost, low-power radio system having reduced capabilities. The owners can put the fBS in their building to boost bandwidth and coverage area and enable new applications such as fixed/mobile convergence. Being located in the owner's building, the fBS often provides higher signal strength and better link quality than the MS would get from the mBS outside the owner's building.

SUMMARY

According to an example embodiment, a method for wireless communication includes establishing a communication session between a base station associated with a wireless network and a network access device associated with a separate communications network. The network access device provides the base station access to the communications network. The method further includes receiving location information from the network access device. The location information describes the location of the network access device. The network device receives the location information from a server on the communications network. In addition, the method includes providing a service to at least one wireless device utilizing the location information.

The wireless network may be a WiMAX network. The network access device may be a modem. The method may further include communicating with at least one other networking device when establishing the communication session with the network access device. The method may include sending a request for the location information to the network access device by sending a Simple Network Management Protocol message to the network access device.

According to an example embodiment, an apparatus for wireless communication includes an interface operable to be coupled to a network access device. The network access device provides access to a communication network. The apparatus also includes a processor. The processor is operable to receive location information from the network access device at the interface. The location information describes the location of the network access device. The apparatus also includes a radio that may be used to provide a service to at least one wireless device utilizing the location information.

Depending on the specific features implemented, particular embodiments may exhibit some, none, or all of the following technical advantages. In some embodiments, authorization which requires location information of a network entity may be accomplished without the use of costly hardware, such as GPS devices. In various embodiments, manual configuration of the network entity seeking authorization may be reduced. Location based services may also be supported. Other technical advantages will be readily apparent to one skilled in the art from the following figures, description and claims.

BRIEF DESCRIPTION OF THE DRAWINGS

Reference is now made to the following description taken in conjunction with the accompanying drawings, wherein like reference numbers represent like parts and which.

DETAILED DESCRIPTION

Figure 1:
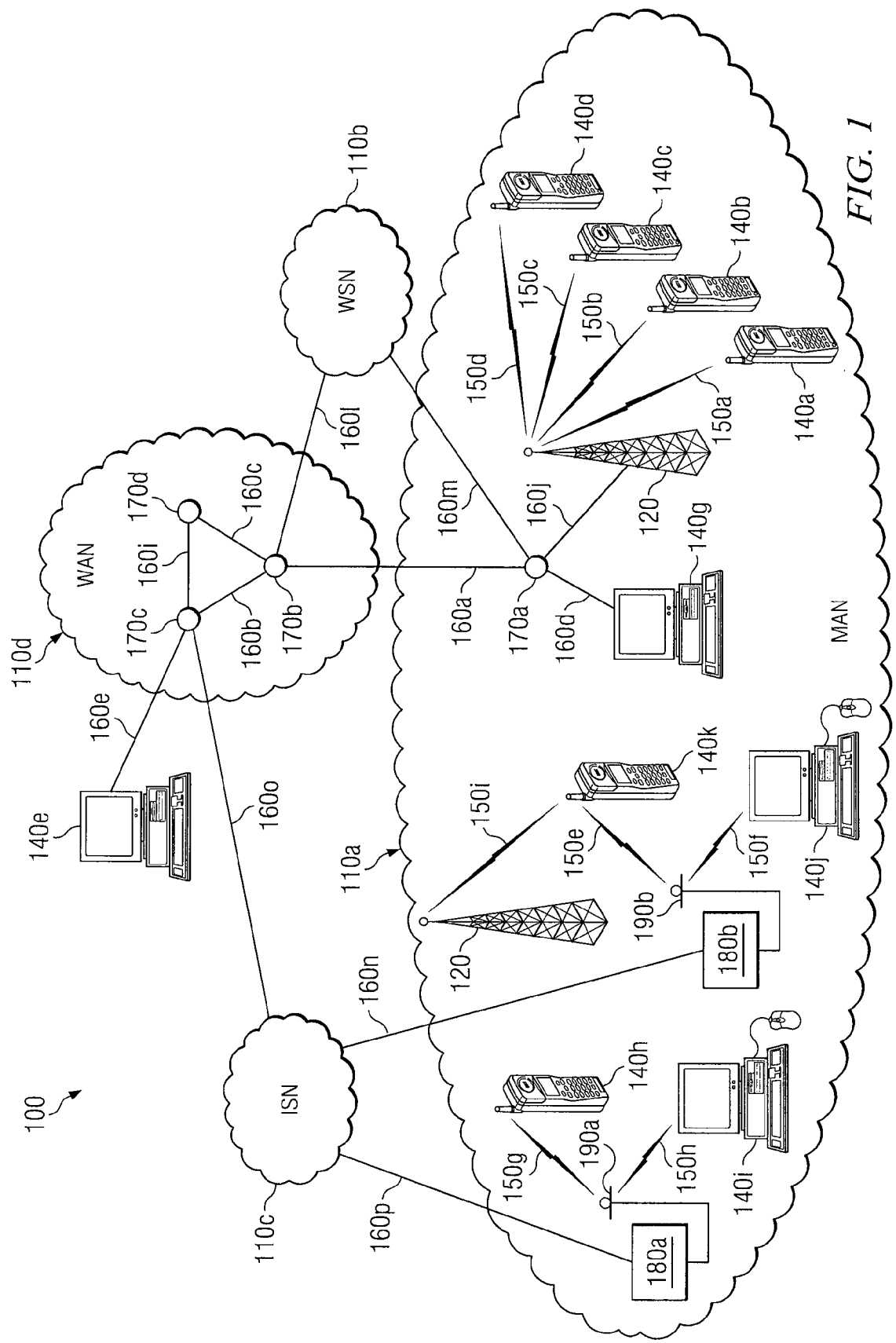
FIG. 1 illustrates a communication system comprising various communication networks, in accordance with a particular embodiment.

FIG. 1 illustrates a communication system comprising various communication networks, in accordance with a particular embodiment. Communication system 100 may be comprised of multiple networks 110. Each network 110 may be any of a variety of communication networks designed to facilitate one or more different services either independently or in conjunction with other networks. For example, networks 110 may facilitate Internet access, wireless access (e.g., a WiMAX service) online gaming, file sharing, peer-to-peer file sharing (P2P), voice over Internet protocol (VoIP) calls, video over IP calls, or any other type of functionality typically provided by a network. Networks 110 may provide their respective services using any of a variety of protocols for either wired or wireless communication. For example, network 110*a* may comprise an 802.16 wireless network (e.g., 802.16j), popularly known as WiMAX, which may include macro base stations (mBSs), such as mBS 120, and femto base stations (fBSs), such as fBSs 190.

For simplicity and ease of discussion the remainder of this description may use a simplified nomenclature for the various entities that may be involved. 'Owner' may refer to the entity that has purchased an fBS or to whom the fBS is registered. 'User' may refer to the entity that is consuming wireless resources. 'Internet service' may refer to the service that the owner uses to access external networks, such as the Internet. While the term 'Internet' is used, it is used for simplicity and is not intended to be limited to only the Internet but includes any type of network, including public and private networks, that the fBS may use to establish its backhaul connection. 'Internet service provider' (ISP) may refer to the entity that provides the Internet service for the owner. 'Wireless service' or 'carrier service' may refer to the service that the user uses for wireless access, such as WiMAX. 'Wireless service provider' (WSP) may refer to the entity that provides the wireless service for the user or owner. While this nomenclature is used for simplicity, it does not represent the entire scope of all possible embodiments. For example, an owner may also be a user and the ISP may also be the WSP. As another example, the ISP may not be directly providing the owner with Internet access (e.g., the ISP may provide a building with Internet access, the building owner may then provide the fBS owner with Internet access).

The embodiment depicted in FIG. 1 includes fBSs 190. fBSs 190 may, in essence, be small base stations purchased (or leased) by the owner from the WSP. The owner is then responsible for installing the fBS, for example at his premise. Once installed the fBS provides a geographically small coverage area that may be used to enhance the signal coverage within the owner's premise. Depending on the scenario, the owner may share this coverage with other, unknown users (e.g., the fBS is a public fBS), or he may limit it to known/authorized users (e.g., the fBS is a private fBS).

The fBS is envisioned as being installed at the owner premise by the owner with little or no support from the WSP. This is different than other types of small base station entities, which are typically installed and commissioned by the WSP. Since fBSs are operated in a home or office environment, it may be natural to consider fBSs 190 as private equipment accessible only by the owners' endpoints 140. However, in certain situations the owner of an fBS may provide wireless service to endpoints 140 of non-owners. Such fBSs may be referred to as public accessible fBSs.

Because the owner may purchase the fBS from a WSP and install it in their home, or virtually at any location with a broadband connection, the WSP may have little or no control over the location of fBSs 190. Accordingly, the WSP may attempt to determine the location of fBS 190 as part of an fBS initialization and operation procedure. There may be at least two considerations that a WSP may have with respect to the location of the fBS:

1.) The fBS may only be authorized to operate in a geographic area where the WSP has a license to use the spectrum. Accordingly, the operator may need to know the location of the fBS with an accuracy of 10 km to meet the spectrum license requirement.

2.) The WSP may need to know the position of an fBS within the accuracy of 100 m in order to provide location-based services (e.g., E911) and to optimize the wireless operation of its wireless networks through radio resource management (e.g., assigning proper carrier/segment/subchannels and fBS transmission power based on interference coming from the other fBSs in the same neighborhood) to ensure quality of service levels.

Part of the installation process for the fBS may include providing it with Internet access for its backhaul connection. In the scenario depicted in FIG. 1, fBSs 190 are connected to network access devices 180. This connection may provide fBSs 190 with their backhaul connection to the WSP's network, wireless service network (WSN) network 110b. Network access devices 180 may provide the owner with general Internet access. fBSs 190 do not use dedicated backhaul communication lines associated with the WSP, but rather use the owner's existing Internet access. Depending on the embodiment and scenario the ISP and the WSP may be the same entity.

WSN 110b may, in some embodiments, comprise various nodes that facilitate communication sessions occurring in network 110a. For example, WSN 110b may include servers and/or gateways which communicate with entities within network 110a. The nodes within WSN 110b may provide authorization and/or other services to the nodes of network 110a. One or more network operators may utilize the resources within WSN 110b to provide administration services to the nodes of network 110a.

In some embodiments, fBSs 190 may be configured to obtain location information from network access devices 180. The location information may be a physical address, zip code, area code, latitude/longitude coordinates, or any other suitable form of location information. Network access devices 180 may be configured to retrieve location information from a network coupled to it, such as network 110c. In some embodiments, fBSs 190 may utilize the location information to provide various services and/or features to endpoints 140. For example, fBSs 190 may be configured to transmit the location information to one or more entities within WSN 110b in order to receive authorization to provide one or more endpoints 140 with access to WSN 110b. Further details and embodiments of this process are described below with respect to FIGS. 2 and 3.

Fixed-mobile convergence (FMC) is the scenario where users can enjoy service continuity and service integration when they move between outdoor and indoor environments. fBSs 190 may facilitate FMC by allowing endpoints 140 to use a single wireless interface. More specifically, once fBS 190b, for example, is installed in the owner's home he is able to use the same mobile device with the same wireless interface to connect to either mBS 120 outside or fBS 190b inside. The selection of which device to connect to can be made manually by the user or autonomously by endpoint 140k, BS 120, or any component coupled to or controlled by WSN 110b.

Each of endpoints 140 is connected to one of mBS 120 or fBSs 190. For simplicity, the component to which an endpoint is connected may be referred to as an access station. For example, the access station for endpoint 140e is fBS 190a. Between each endpoint 140 and its respective access station there may be a wireless connection 150, sometimes referred to as an access link. These wireless connections may be referred to as access links because they provide the endpoint with access to a network.

A wireless connection may comprise various wireless resources such as, for example, a combination of a particular center frequency, a particular bandwidth, a particular time slot, and/or a particular subchannel (for example, as described in a downlink or uplink map). In particular embodiments, it may be convenient to discuss the resources used by a link in terms of slots. Depending on the embodiment, a slot may comprise a particular number of subchannels and symbols (also known as time slots). For example, Section 8.4.3.1 of the Institute of Electrical & Electronics Engineers (IEEE) 802.16e-2005 Standard specifies a slot comprising a single subchannel and two symbols.

An increase in the number of wireless connections 150 within a given area may increase the impact and severity of interference between wireless connections 150. Accordingly, it may be desirable to know where a particular fBS has been configured. In particular embodiments, uplink sounding may be used to estimate the channel gain and interference strength between mBS 150 and fBSs 190. The uplink sounding may, therefore, be used in determining the quality and/or efficiency of the various wireless connections.

Although the example communication system 100 of FIG. 1 includes various different networks, networks 110a-110d, the term "network" should be interpreted as generally defining any network or combination of networks capable of transmitting signals, data, and/or messages, including signals, data or messages transmitted through WebPages, e-mail, text chat, voice over IP (VoIP), and instant messaging. Depending on the scope, size and/or configuration of the network, any one of networks 110a-110d may be implemented as a LAN, WAN, MAN, PSTN, WiMAX network, global distributed network such as the Internet, Intranet, Extranet, or any other form of wireless or wired networking.

Networks 110 may include any number and combination of wired links 160, wireless connections 150, nodes 170 and/or endpoints 140. For purposes of illustration, and only by way of example, network 110a is a MAN that may be implemented, at least in part, via WiMAX; network 110b is a wireless service network (WSN) which may be operated by the WSP responsible for providing network 110a with wireless service (e.g., WiMAX); network 110c is an Internet service network (ISN) which may be operated by the ISP responsible for providing its users with Internet access; and network 110d is a WAN, such as the Internet. Though not depicted in FIG. 1, both WSN network 110b and ISN network 110c may include servers, modems, gateways and any other components that may be needed to provide their respective service.

While networks 110 have been depicted as four separate networks, depending on the scenario any two, or more, of the networks may be a single network. For example, the WSP and the ISP may be the same business entity which may maintain the necessary components for both services on the same network thus merging ISN network 110c and WSN network 110b into a single network. Furthermore, the interconnections between networks 110 may vary from those depicted in FIG. 1.

Generally, networks 110a-d provide for the communication of packets, cells, frames, or other portions of information (generally referred to as packets herein) between endpoints 140 and/or nodes 170 (described below). In particular embodiments, networks 110a-d may be IP networks. IP networks transmit data by placing the data in packets and sending each packet individually to the selected destination, along one or more communication paths. Network 110d may be coupled to network 110b through a gateway. Depending on the embodiment, the gateway may be a part of network 110b and/or 110d (e.g., nodes 170e and/or 170c may comprise a gateway).

Any of networks 110a-c may be coupled to other IP networks including, but not limited to, the Internet. Because IP networks share a common method of transmitting data, signals may be transmitted between devices located on different, but interconnected, IP networks. In addition to being coupled to other IP networks, any of networks 110a-c may also be coupled to non-IP networks through the use of interfaces or components such as gateways.

Networks 110 may be connected to each other and with other networks via a plurality of wired links 160, wireless connections 150, and nodes 170. The interconnection of networks 110 may enable endpoints 140 to communicate data and control signaling between each other as well as allowing any intermediary components or devices to communicate data and control signals. Accordingly, users of endpoints 140 may be able to send and receive data and control signals between and among each network component coupled to one or more of networks 110.

As mentioned above, the coverage quality of network 110a may be enhanced through the use of fBSs 190. More specifically, the relatively reduced range of a WiMAX fBS may allow network 110a to provide improved signal quality and/or capacity to users within smaller areas, for example within a building. fBSs 190 may be able to provide their access links through the use of existing network access. More specifically, an fBS 190 may connect to an owner's network access device 180. Once connected, fBS 190 may use the owner's Internet access, provided by the owner's ISP via the ISP's network (e.g., network 110c), for its backhaul connection to the WSP's network (e.g., network 110b).

Nodes 170 may include any combination of network components, modems, session border controllers, gatekeepers, ISN gateways, WSN gateways, security gateways, operation administration maintenance and provisioning (OAM&P) servers, network access provider (NAP) servers, base stations, conference bridges, routers, hubs, switches, gateways, endpoints, or any other hardware, software, or embedded logic implementing any number of communication protocols that allow for the exchange of packets in communication system 100. For example, node 170a may comprise another mBS that is wired to mBS 120 via link 160j and to network 110d via link 160a. As a mBS, node 170a may be able to establish several wireless connections of its own with various other mBSs and/or endpoints.

Network access devices 180 may provide Internet access to fBSs 190 through any combination of hardware, software embedded in a computer readable medium, and/or encoded logic incorporated in hardware or otherwise stored (e.g., firmware). In particular embodiments, network access device 180 may be supplied by the owner's ISP. For example, if the owner's ISP is a cable company then the ISP may supply a cable modem as the network access device 180. As another example, if the owner's ISP is a phone company then the ISP may supply an xDSL modem as the network access device 180. As may be apparent, network access device 180 may provide Internet access to components other than fBSs 190. For example, the owner may connect his personal computer to network access device 180 to access the Internet.

Endpoints 140 and/or nodes 170 may provide data or network services to a user through any combination of hardware, software embedded in a computer readable medium, and/or encoded logic incorporated in hardware or otherwise stored (e.g., firmware). For example, endpoints 140a-140k may include a cell phone, an IP telephone, a computer, a video monitor, a camera, a personal data assistant or any other hardware, software and/or encoded logic that supports the communication of packets (or frames) using one or more of networks 110. Endpoints 140 may also include unattended or automated systems, gateways, other intermediate components or other devices that can send or receive data and/or signals.

Although FIG. 1 illustrates a particular number and configuration of endpoints, connections, links, and nodes, communication system 100 contemplates any number or arrangement of such components for communicating data. In addition, elements of communication system 100 may include components centrally located (local) with respect to one another or distributed throughout communication system 100.

Figure 2:
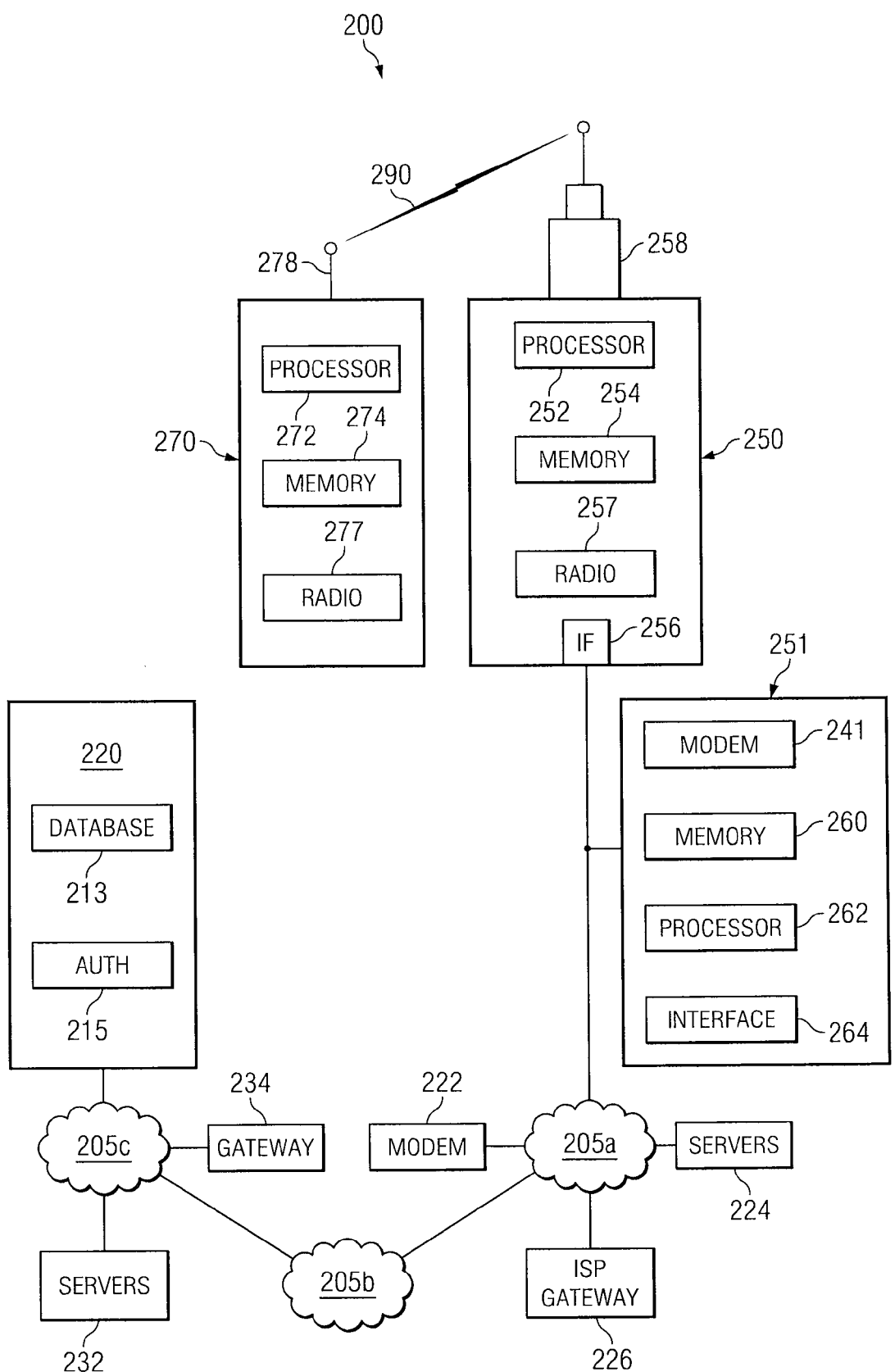
FIG. 2 illustrates one embodiment of a wireless network comprising an endpoint, a network access device and a femto base station.

FIG. 2 illustrates a wireless network comprising a more detailed view of various network components in accordance with a particular embodiment. More specifically, the depicted embodiment is a simplified scenario comprising networks 205, authorization server 220, fBS 250, network access device (NAD) 251, and endpoint 270. In different embodiments, network 200 may comprise any number of wired or wireless networks, endpoints, fBSs, and/or any other components that may facilitate or participate in the communication of data and/or signals whether via wired or wireless connections. NAD 251 and fBS 256 comprise processors 262 and 252, memory 260 and 254, communication interfaces 264 and 256. fBS 256 also comprises radio 257 and antenna 258. Similarly, endpoint 270 comprises processor 272, memory 274, radio 277, and antenna 278. These components may work together in order to provide wireless networking functionality, such as providing endpoints with wireless connections in a wireless network (e.g., a WiMAX wireless network).

Networks 205 may comprise separate but interconnected networks operated by one or more different operators. More specifically, network 205a may be the ISP's network. The owner of fBS 250 may use network 205a for Internet access. In providing the owner with network access, the ISP's network 205a may include modems 222, servers 224, and ISP gateway 226. Modems 222 may be used by the ISP to communicate with the owner's network access device 251. Thus, network access device 251 and modems 222 may have complimentary hardware and/or software that may enable them to communicate data between one another. Network access device 251 may act as the owner's access point, similar to network access device 180 discussed above with respect to FIG. 1. Modems 222 may act as a gateway between the ISP's network 205a and the owner's network access device 251. In particular embodiments, modems 222 may contain security gateway functionality. Servers 224 may comprise one or more servers such as OAM&P servers, Authorization, Authorization and Accounting (AAA) servers, Dynamic Host Configuration Protocol (DHCP) servers, or any other servers that the ISP may need to provide the owner with network access (or any other features provided by the ISP). ISP gateway 226 may comprise any hardware and/or software needed to couple network 205a with network 205b. For example, ISP gateway 226 may include switches, routers, firewalls, proxy servers, and other suitable equipment or software.

Network 205c may be a WiMAX service provider's network. In some embodiments, network 205c may be, a network provider using other access technologies (such as Long Term Evolution (LTE) service or even non-wireless service) that provide location based services. Depending on the scenario, network 205c may be the user's or the owner's WiMAX service provider's network. In providing the WiMAX service, network 205c may utilize servers 232 and gateway 234. Servers 232 may comprise one or more servers such as OAM&P servers, Network Access Provider (NAP) servers, AAA servers, Self Organizing Network (SON) servers or any other servers that the WiMAX provider may need to configure/authenticate fBS 250 and provide users with WiMAX service. For example, servers 232 may use authorization server 220 in order to configure/authenticate fBS 250. Authorization server 220 includes database 213 which may include subscriber information, fBS information, and authorized location information. Authorization server 220 also includes authorization module 215 which may receive information from servers 232 or gateway 234 and compare it to the information in database 213. Gateway 234 may comprise any hardware and/or software (such as switches, routers, firewalls, proxy servers) needed to couple network 205c with network 205b.

Networks 205a and 205c may be coupled via network 205b. In some embodiments, network 205b may be the Internet. Thus, in such embodiments, fBS 250 may connect to the WSP's network, network 205c, via the Internet. Though network 205b is depicted as a single network, it may comprise any number of the networks described above with respect to FIG. 1. For example, network 205b may comprise the Internet, a LAN, WAN, MAN, PSTN or some combination of the above.

Processors 252, 262 and 272 may be microprocessors, controllers, or any other suitable computing devices, resources, or combinations of hardware, software and/or encoded logic operable to provide, either alone or in conjunction with other components, (e.g., memory 254 and/or 274) wireless networking functionality. Such functionality may include providing various wireless features discussed herein. For example, processors 252, 262, and 272 may be able to determine location information for fBS 250. Additional examples and functionality provided, at least in part, by processors 252, 262 and 272 will be discussed below.

Memory modules 254, 260 and 274 as well as database 213 may be any form of volatile or non-volatile memory including, without limitation, magnetic media, optical media, random access memory (RAM), read-only memory (ROM), flash memory, removable media, or any other suitable local or remote memory component or components. Memory modules 254, 260 and 274 as well as database 213 may store any suitable data, instructions, logic or information utilized by fBS 250, NAD 251, endpoint 270, and authorization server 220 respectively, including software embedded in a computer readable medium, and/or encoded logic incorporated in hardware or otherwise stored (e.g., firmware). For example, in particular embodiments, memory modules 254 and 274 may store location information regarding fBS 250 and/or a manner of retrieving location information of fBS 250. Memory modules 254 and 274 may also maintain a list, database, or other organization of data useful for determining how to route data to the proper component. Additional examples of information stored by memory modules 254 and 274 as well as database 213 will be discussed below.

Radios 257 and 277 may be coupled to or a part of antennas 258 and 278, respectively. Radios 257 and 277 may receive digital data that is to be sent out to other fBSs and/or endpoints via a wireless connection. Radios 257 and 277 may convert the digital data into a radio signal having the appropriate center frequency and bandwidth parameters. The radio signal may then be transmitted via antennas 258 and 278 to the appropriate recipient. Similarly, radios 257 and 277 may convert radio signals received via antennas 258 and 278, respectively, into digital data to be processed by processors 252 or 272, as appropriate.

Antennas 258 and 278 may be any type of antenna capable of transmitting and receiving data and/or signals wirelessly. In some embodiments, antennas 258 and 278 may comprise one or more omni-directional, sector or panel antennas operable to transmit/receive radio signals between 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. Together, radio 257 and antenna 258 and radio 277 and antenna 278 may each form a wireless interface.

Communication interfaces 256 and 264 may be used for the wired communication of signaling and/or data between fBS 250 and networks 205 and between NAD 251 and fBS 250 as well as networks 205. For example, communication interface 256 may comprise an interface (e.g., RJ-45) that is compatible with a corresponding interface on network access device 251, such as an Ethernet interface. While not depicted, endpoint 270 may also include wired interfaces.

As noted above with respect to fBSs 190, fBS 250 may, in essence, be a small base station providing a limited coverage area for a home or office. Depending on the embodiment and configuration of fBS 250 it may be public or private. fBS 250 may rely on the owner's network access, via NAD 251, to provide the backhaul connection to network 205c, as opposed to the WiMAX service provider supplying the backhaul connection as is the case with an mBS.

NAD 251 may be used to provide the owner with Internet access. fBS 250 may utilize the Internet access for its backhaul connection to WiMAX network 205c. Depending on the type of network service and/or the owner's service provider, NAD 251 may be a cable modem, a digital subscriber line (DSL) modem, a fiber optic modem, or any other modem, gateway or network access device provided by the owner's network service provider. The owner may have any number of routers, switches and/or hubs between fBS 250 and NAD 251. NAD 251 may also be configured to receive location information from network 205a and send the location information to fBS 250. The location information may be a physical address, zip code, area code, latitude/longitude coordinates, or any other suitable form of location information. The location information transmitted to fBS 250 may be analyzed and other types of location information may be inferred as a result. For example, fBS 250 may receive a physical address from NAD 251 and may determine latitude/longitude coordinates from the physical address. fBS 250 may utilize nodes within network 205c to accomplish such analysis. In some embodiments, an operator within network 205a can associate NAD 251 to subscription information in a database with the owner or specific information associated with NAD 251, such as the NAD's 251 MAC address (serial number), or the username/password provided by the subscriber when he logs in.

As part of establishing a backhaul connection, fBS 250 may communicate with NAD 251. NAD 251, which may be provided or authorized by the owner's ISP, may provide fBS 250 with access to the ISP's network 205a which may then allow access to network 205c, via network 205b. Accessing network 205a may involve modem 241 communicating with the ISP's modems 222.

The ISP may operate one or more servers 224 (e.g., OAM&P, AAA, DHCP servers) in providing the owner with Internet access. For example, the owner may have a digital subscriber line (DSL) account for network access with a DSL provider. Servers 224 may ensure that the owner has paid his bills and is otherwise in good standing with the DSL provider. Servers 224 may also contain information about subscribers, such as location information. Servers 224 may be configured to communicate the location information to NAD 251 either automatically upon coupling to NAD 251 or in response to a request from NAD 251.

ISP gateway 226 may connect ISP network 205a with the Internet (e.g., network 205b). This may allow fBS 250 to access WiMAX network 205c via the Internet. In connecting network 205a with the Internet, gateway 226 may perform any necessary formatting and/or security functions.

WiMAX network 205c may have its own gateway 234 and servers 232. Similar to the servers and gateways of ISP network 205a, gateway 234 and servers 232 may ensure that the owner has a valid WiMAX account and that network 205c is able to communicate with other networks, such as network 205b. Servers 232 may also contain information, data, instructions and/or logic that may be used to provision various features and functionality of fBS 250. For example, they may provide fBS 250 with channel information for its wireless connection 290 with endpoint 270.

Endpoints 270 may be any type of wireless endpoints able to send and receive data and/or signals to and from fBS 250. Some possible types of endpoints 270 may include desktop computers, PDAs, cell phones, smart phones, laptops, and/or VoIP phones.

The following examples may help to illustrate how these components inter-work with one another to provide the functionality of particular embodiments. In one example embodiment, NAD 251 may establish a connection with network 205a utilizing modem 241 and/or interface 264. NAD 251 may send authorization information to elements coupled to network 205a, such as modem 222, servers 224, and/or ISP gateway 226. Servers 224 may provide location information to NAD 251, which may be stored in any form of suitable memory structure within memory 260. Servers 224 may provide the location information automatically after NAD 251 has been authorized or it may do so in response to a request for the information from NAD 251. fBS 250 may establish a communication session with NAD 251 utilizing interfaces 256 and 264. During the communication session, NAD 251 may send fBS 250 the location information. This may occur upon establishment of the communication session or in response to a request sent by fBS 250. fBS 250 may utilize the location information to provide various services and/or features to endpoint 270; for example, fBS 250 may be configured to support emergency services such as E-911 utilizing the location information and provide that service to endpoint 270. Various embodiments may provide the advantage of providing reliable location information for devices on the network without having to add expensive equipment to the devices (such as GPS equipment).

Servers 232 may be configured to receive the location information as part of an authorization procedure in order to allow fBS 250 to communicate in various ways within network 205c. Servers 232 may communicate the location information to authorization server 220. Authorization module 215 may compare the received location information with information stored in database 213. Database 213 may include identification information for fBS 250 as well as location information which describes geographic region(s) within which fBS 250 is authorized to operate. Authorization module 215 may determine whether the received location information corresponds to the authorized geographic region(s) of fBS 250. If the received location information is within the authorized geographic region(s), authorization server 220 may indicate this to servers 232. In this situation, fBS 250 may gain one or more types of access to network 205c. If the received location information is not within the authorized geographic region(s), authorization server 220 may indicate this to servers 232. This may cause fBS 250 not to gain at least one type of access to network 205c.

fBS 250 may be configured to request location information from NAD 251 upon establishing the communication session. In various embodiments, NAD 251 may be configured to transmit location information to fBS 250 automatically after establishing a communication session with fBS 250.

NAD 251, servers 224, and fBS 250 may accomplish the described functions using a variety of communication schemes. In some embodiments, NAD 251 and servers 224 may communicate using the IP address and Simple Network Management Protocol (SNMP) on an OAM (Operation, Administration, Maintenance) interface of the ISP network. NAD 251 and servers 224 may send SNMP messages to each other to request and send location information. fBS 250 may be configured to communicate with NAD 251 directly or through various gateways or routers. The connection from fBS 250 to NAD 251 may be an IP connection, so NAD 251 may have access to an IP packet sent by fBS 250. A UDP port number may be agreed upon by fBS 250 and NAD 251. After fBS 250 is powered up and obtains its IP address from (or through) NAD 251, it may establish NAD 251 as its default gateway. fBS 250 may send a SNMP query using the address of NAD 251 and the agreed upon UDP port number. When an SNMP agent in NAD 251 receives this query, it may reply with a SNMP message that includes the location information. In some embodiments, the default gateway for fBS 250 may not be NAD 251. In such embodiments, the default gateway for fBS 250 may forward the query to NAD 251 and forward responses from NAD 251 to fBS 250. The SNMP functionality described here may be implemented in fBS 250 and NAD 251 using processors 252 and 262 as well as memory modules 254 and 260.

Thus far several different embodiments and features have been presented. Particular embodiments may combine one or more of these features depending on operational needs and/or component limitations. This may allow for great adaptability of network 200 to the needs of various organizations and users. In some embodiments, fBS 250 may have more or less radios. Some embodiments may include additional features.

Figure 3:
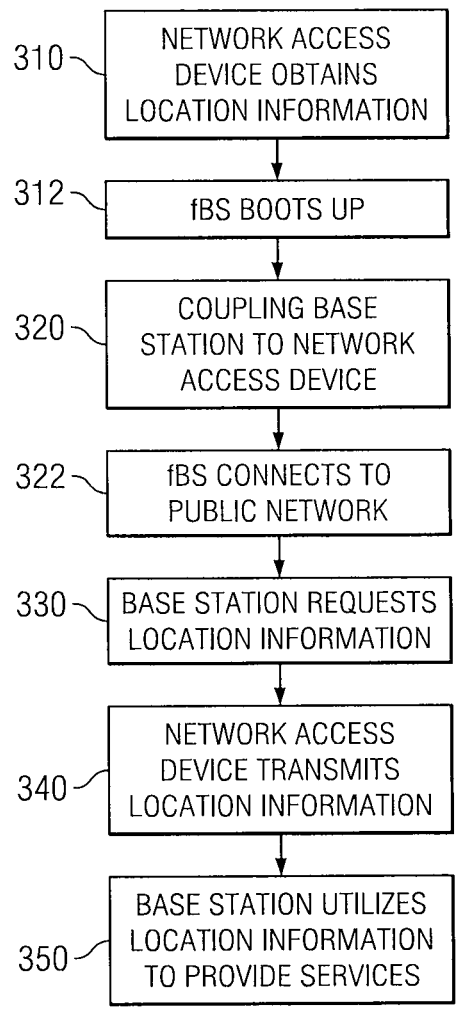
FIG. 3 is a flowchart illustrating one embodiment of the operation of a femto base station.

FIG. 3 illustrates a flowchart of one embodiment of the operation of a wireless communication network. In general, the steps illustrated in FIG. 3 may be combined, modified, or deleted where appropriate, and additional steps may also be added to the example operation. Furthermore, the described steps may be performed in any suitable order.

At step 310, a network access device may obtain location information from an ISP network. In some embodiments, the location information of subscribers to the ISP network may be stored in a server at the ISP network, such as servers 224 of FIG. 2. The network access device, such as NAD 251, may be configured to receive the location information during an initialization process the network access device undergoes when first connecting to an ISP network. In various embodiments, the network access device may request the location information from the ISP network after it has established a communication session with the ISP network. For example, the network access device may request the location information after it has been authenticated and granted access to the ISP network. In some embodiments, the network access device may request the location information in response to receiving a request for the location information from another device (such as fBS 250). The network access device may store the information in memory, such as memory 260.

In some embodiments, an OAM interface at the ISP network may transfer the location information to the network access device utilizing the IP address of the network access device and an available UDP port. The OAM interface may utilize the SNMP protocol to transmit the location information to the network access device. The location information may also be transmitted utilizing a variety of protocols and communication schemes, such as Transmission Control Protocol (TCP), File Transfer Protocol (FTP), and/or Secure Shell (SSH). In addition, other aspects of the ISP network may transmit the location information. For example, any of the devices encompassed by modem 222, servers 224, and ISP gateway 226 may be utilized in transmitting the location information to the network access device. In some embodiments, a combination of these devices may be used. For example, one device (which may be included within servers 224) may retrieve the location information from memory and transmit it to another device (which may be included within modem 222 and/or ISP gateway 226) that will transmit the location information to the network access device.

At step 312, a base station, such as an fBS, may receive power and/or be otherwise turned-on and then boots up. During boot-up the fBS may execute a predetermined set of procedures that may load any software applications desired for operation. The applications that are loaded, and the order in which they are loaded, may vary depending on the particular implementation. The applications may be stored in a memory module, such as memory 254. Loading the applications may be accomplished by utilizing a processor, such as processor 252. Regardless of the order or specifics of the procedures implemented by the fBS during boot-up at step 312, once step 312 is complete the fBS may be functional such that any software applications that may be needed may be loaded into memory (e.g., memory 254).

At step 320, the fBS may be coupled to the network access device. The base station may be a coupled to the network access device using wired and/or wireless interfaces. For example, the base station may be directly connected to the network access device using a cable. In another example, the base station may be connected to one or more other networking devices, such as gateway(s), hub(s), or router(s); the one or more other networking devices may be coupled to the network access device, thus coupling the base station to the network access device. Identifiers associated with either the fBS or the network access device may be communicated between the fBS and the network access device. In some embodiments, these identifiers may include IP addresses and/or available port numbers. Examples of wireless protocols that may be used to couple the base station to the network access device include Bluetooth, Infrared, and the IEEE 802.11 wireless specification. These example wireless protocols may also be used in embodiments where the base station is not directly connected to the network access device (such as when the base station is connected to a gateway device).

At step 322, the fBS attempts to connect to a public access network through the network access device, such as ISN network 110c described above with respect to FIG. 1. This connection provides the fBS with its backhaul connection to the appropriate WSP's network. As discussed above, the backhaul connection may use the owner's own general use Internet access (e.g., the Internet access that the owner may use with his laptop to access the Internet) provided by an ISP. Depending on the embodiment, the public access network connection may be provided through xDSL, cable, or any other suitable and/or available network access means. In some embodiments, the fBS is connected to a leased or private access communication network. Regardless of the type of network access that is used, the fBS or the network access device to which the fBS is connected may typically establish a connection (including, e.g., receiving an IP address) with the ISP's network in order to proceed.

At step 330, the fBS may request the location information from the network access device. In some embodiments, this may occur automatically after the fBS is coupled to the network access device. The request for the location information may occur anytime after the fBS is coupled to the network access device. In some embodiments, the fBS may utilize an IP address associated with the network access device as the destination of an SNMP message which contains the request for the location information. The fBS may send the SNMP message utilizing an available UDP port on the network access device. The request may also be transmitted utilizing a variety of protocols and communication schemes, such as TCP, FTP, and/or SSH.

In some embodiments, the fBS may transmit the request for the location information to the other one or more networking devices which may then transmit the request directly to the network access device.

At step 340, the network access device may transmit the location information to the fBS. In some embodiments, this may occur without the need for the fBS to send a request for the location information (as in step 330). In such embodiments, the network access device may be configured to automatically transmit the location information to the fBS after the network access device is coupled to the fBS. The network access device may transmit the location information to the fBS by using an IP address associated with the fBS and an available UDP port. The location information may also be transmitted utilizing a variety of protocols and communication schemes, such as TCP, FTP, and/or SSH.

In some embodiments, the network access device may transmit the location information to the network access device via one or more other networking devices that may then transmit the location information directly to the fBS as described above.

At step 350, the fBS may provide one or more services and/or features to an endpoint utilizing the location information. In some embodiments, the fBS may provide location based services to the endpoint. Examples of such services may be emergency services such as E-911 and providing local point of interest information (such as local directory information). The fBS may also support more sophisticated forms of service such as those that relate to the actual premises upon which the fBS is installed. For example, if the fBS is installed at a shopping mall, the fBS may be able to provide information or offers related to the stores within the shopping mall (e.g., coupons). Other suitable location based services are contemplated as deliverable by the fBS utilizing the location information.

At step 350, the fBS may also provide other types of services utilizing the location information. For example, the fBS may communicate the location information to a network operator of the WSP. The location information may be transmitted as part of an access request sent by the fBS. In some embodiments, a fBS, such as fBS 250, may be configured to enter an authorization session with node(s) within a network such as network 205c. The fBS may carry out the authorization session through a transport network, such as network 205a. As part of the authorization session, the fBS may communicate an access request including the location information utilizing the transport network to the node(s) participating in the authorization session. The fBS may utilize the network access device or other gateways to which it is coupled in order to communicate the location information.

The network operator may authorize the fBS based, at least in part, on the received location information. For example, the network operator may authorize the fBS if the location information lies within a geographical region within which the fBS is allowed to operate. The network operator may process the received location information in order to facilitate the authorization. For example, the location information may include an address or zip code. The network operator may convert this type of location information to latitude/longitude coordinates and use these coordinates to determine if the fBS lies within an appropriate geographical region.

Although several embodiments have been illustrated and described in detail, it will be recognized that modifications and substitutions are possible without departing from the spirit and scope of the appended claims.

What is claimed is:

1. A method for wireless communication, comprising:
   establishing a communication session between a base station associated with a wireless network and a network access device associated with a separate communications network, the network access device providing the base station access to the wireless network through the communication network;
   receiving location information from the network access device at the base station, wherein the network access device receives the location information from a server on the communication network and wherein the location information describes the location of the network access device; and
   utilizing the location information to provide a service to at least one wireless device.

2. The method of claim 1, wherein utilizing the location information to provide the service to the at least one wireless device comprises:
   sending the location information from the base station to the wireless network utilizing the communication network;
   receiving authorization at the base station to utilize the wireless network in response to sending the location information; and
   at the base station, providing at least one wireless device with access to the wireless network in response to receiving authorization to utilize the wireless network.

3. The method of claim 1, wherein utilizing the location information to provide the service to the at least one wireless device comprises providing at least one location based service to the at least one wireless device.

4. The method of claim 3, wherein the at least one location based service comprises emergency services.

5. The method of claim 3, wherein the at least one location based service comprises providing information regarding local points of interest.

6. The method of claim 1, wherein the wireless network comprises a WiMAX network.

7. The method of claim 1, wherein the network access device comprises a modem.

8. The method of claim 1, wherein establishing the communication session with the network access device comprises communicating with at least one other networking device.

9. The method of claim 1, wherein receiving the location information from the network access device comprises receiving a Simple Network Management Protocol message to the network access device.

10. The method of claim 1, wherein the location information comprises a physical address.

11. The method of claim 1, wherein the server comprises an Operation, Administration, Maintenance server.

12. The method of claim 1, wherein the location information comprises latitude and longitude coordinates.

13. The method of claim 1, further comprising requesting, at the base station, the location information from the network access device before receiving the location information.

14. A method for wireless communication, comprising:
    establishing a communication session between a network access device and a server at a communication network;

receiving location information from the server at the network access device, wherein the location information describes the location of the network access device;

establishing a communication session between the network access device and a base station, wherein the base station is associated with a wireless network;

coupling the base station to the communication network such that the base station may communicate with the wireless network through the communication network; and communicating the location information to the base station such that the base station may provide a service to at least one wireless device utilizing the location information.

15. The method of claim 14, further comprising:

receiving an access request from the base station, wherein the access request comprises the location information and is destined for the wireless network; and communicating the access request to the communication network, for communication to the wireless network.

16. The method of claim 14, wherein the wireless network comprises a WiMAX network.

17. The method of claim 14, wherein the base station is a femto base station.

18. The method of claim 14, wherein establishing the communication session with the base station comprises communicating with the base station via at least one networking device.

19. The method of claim 14, wherein transmitting the location information to the base station comprises sending a Simple Network Management Protocol message to the base station.

20. The method of claim 14, wherein the location information comprises a physical address.

21. The method of claim 14, wherein the server is an Operation, Administration, Maintenance server.

22. The method of claim 14, wherein the service provided by the base station comprises at least one location based service.

23. The method of claim 22, wherein the at least one location based service comprises emergency services.

24. The method of claim 22, wherein the at least one location based service comprises providing information regarding local points of interest.

25. The method of claim 14, wherein the location information comprises latitude and longitude coordinates.

26. The method of claim 14, further comprising receiving a request, from the base station, for the location information before communicating the location information to the base station.

27. An apparatus for wireless communication, the apparatus comprising:

an interface conformed to be coupled to a network access device, the network access device providing access to a wireless network through a communication network; and a processor operable to:
receive location information from the network access device at the interface, wherein the network access device receives the location information from a server on the communication network and wherein the location information describes the location of the network access device; and provide a service to at least one wireless device utilizing the location information through a radio coupled to the processor.

28. The apparatus of claim 27, wherein providing the service to the at least one wireless device comprises:

sending the location information through the interface to the wireless network utilizing the communication network;

receiving authorization to utilize the wireless network in response to sending the location information; and providing at least one wireless device with access to the wireless network in response to receiving the authorization utilizing the radio.

29. The apparatus of claim 27, wherein providing the service to the at least one wireless device utilizing the location information comprises providing at least one location based service to the at least one wireless device utilizing the radio.

30. The apparatus of claim 29, wherein the at least one location based service comprises emergency services.

31. The apparatus of claim 29, wherein the at least one location based service comprises providing information regarding local points of interest.

32. The apparatus of claim 27, wherein the wireless network comprises a WiMAX network.

33. The apparatus of claim 27, wherein the network access device comprises a modem.

34. The apparatus of claim 27, wherein establishing the communication session with the network access device comprises communicating with at least one other networking device.

35. The apparatus of claim 27, wherein the processor is further operable to send a request to the network access device requesting the location information before receiving the location information.

36. The apparatus of claim 27, wherein receiving the location information from the network access device comprises receiving a Simple Network Management Protocol message from the network access device.

37. The apparatus of claim 27, wherein the location information comprises a physical address.

38. The apparatus of claim 27, wherein the location information comprises longitude and latitude coordinates.

* * * * *